United States Patent
Barth

(10) Patent No.: US 9,100,554 B2
(45) Date of Patent: Aug. 4, 2015

(54) METHOD FOR DISPLAYING AN IMAGE ON A DISPLAY DEVICE IN A VEHICLE, DRIVER ASSISTANCE SYSTEM AND VEHICLE

(75) Inventor: Harald Barth, Korntal-Muenchingen (DE)

(73) Assignee: VALEO Schalter und Sensoren GmbH, Bietigheim-Bissingen (DE)

( * ) Notice: Subject to any disclaimer, the term of this patent is extended or adjusted under 35 U.S.C. 154(b) by 470 days.

(21) Appl. No.: 13/640,086

(22) PCT Filed: Apr. 11, 2011

(86) PCT No.: PCT/EP2011/055610
§ 371 (c)(1),
(2), (4) Date: Nov. 19, 2012

(87) PCT Pub. No.: WO2011/141249
PCT Pub. Date: Nov. 17, 2011

(65) Prior Publication Data
US 2013/0057689 A1 Mar. 7, 2013

(30) Foreign Application Priority Data
Apr. 15, 2010 (DE) .......................... 10 2010 015 079

(51) Int. Cl.
*H04N 7/18* (2006.01)
*B60R 1/12* (2006.01)

(52) U.S. Cl.
CPC ........ *H04N 7/181* (2013.01); *B60R 2001/1253* (2013.01)

(58) Field of Classification Search
CPC ................ B60R 1/00; B60R 2300/105; B60R 2300/302; B60R 2300/202; B60R 2300/207; B60R 2300/301; B60R 2300/306; B60R 2300/307; B60R 2300/308; H04N 7/181; G08G 1/16
USPC ........................ 348/118, 148, 113, 115, 119; 701/300–302, 439, 458; 340/995.17, 340/995.18, 995.14, 995.2, 995.22, 340/435–437
IPC ........................................................ H04N 7/18
See application file for complete search history.

(56) References Cited

U.S. PATENT DOCUMENTS 8,880,344 B2 * 11/2014 Mathes et al. ................ 701/300
2004/0260469 A1 12/2004 Mizusawa

FOREIGN PATENT DOCUMENTS

EP     1 179 958 A1      2/2002

OTHER PUBLICATIONS

International Search Report w/translation issued in PCT1EP2011/055610 mailed Aug. 23, 2011 (4 pages.)

* cited by examiner

*Primary Examiner* — Sherrie Hsia
(74) *Attorney, Agent, or Firm* — Osha Liang LLP

(57) ABSTRACT

The invention relates to a method for displaying an image (27, 28, 29) on a display unit (3) in a vehicle (1). A vehicle image (1') of at least one region of the vehicle (1) is provided, and sensor data are acquired, which contain information about an environment of the vehicle (1). An image (27, 28, 29) is displayed, which is formed from the vehicle image (1') and the sensor data, the image (27, 28, 29) containing a blank region (14', 16', 18', 19', 22' to 25') assigned to the environment, for which no sensor data are provided. In the image (27, 28, 29), the vehicle image (1') protrudes into the blank region (14', 16', 18', 19', 22' to 25').

10 Claims, 2 Drawing Sheets

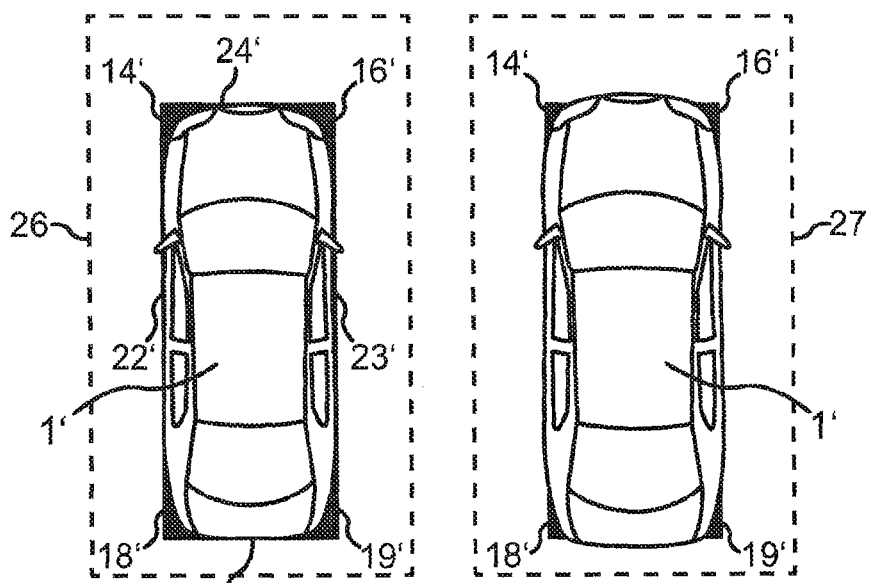
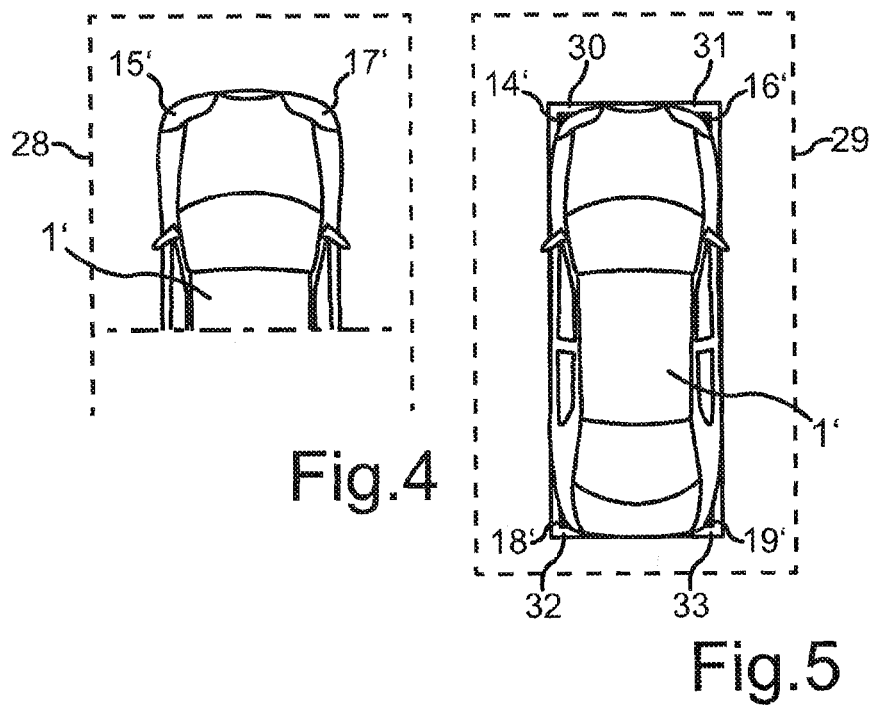

METHOD FOR DISPLAYING AN IMAGE ON A DISPLAY DEVICE IN A VEHICLE, DRIVER ASSISTANCE SYSTEM AND VEHICLE

The invention relates to a method for displaying an image on a display unit in a vehicle. A vehicle image of at least one region of the vehicle is provided. In addition, sensor data are acquired, which contain information about an environment of the vehicle. An image is displayed, which is formed from the vehicle image and the sensor data. The image contains a blank region assigned to the environment, for which no sensor data are provided. The invention additionally relates to a driver assistance system, and also to a vehicle having such a driver assistance system.

Displaying images on a display unit of a vehicle, which represent the vehicle, on the one hand, and its environment, on the other hand, is prior art. In the present case, in particular a top view of the vehicle and its environment (also known under the designation "bird's eye view") is of interest. An image which represents such a top view can be generated by processing the acquired sensor data. For this purpose, image data of a plurality of cameras, which are attached to the vehicle body of the vehicle, are typically processed. An image is then displayed on the display unit, which shows a top view of the vehicle—a vehicle image is typically already previously stored—and its environment—the image of the environment is generated from the sensor data.

For example, four cameras can be used to acquire the sensor data: one camera on the front bumper, one on the rear bumper, one on the left side flank, and one on the right side flank of the vehicle. Regions exist in the environment of the vehicle which cannot be acquired by the cameras. In particular, the rounded corner regions of the vehicle cannot be acquired, and also a near region directly adjoining the outer surface of the vehicle. Therefore, no sensor data exist for these regions, and a realistic image of these regions cannot be represented on the display unit. These problems are dealt with in the prior art in that these blank regions of the environment, for which no sensor data are provided, are represented as black in the displayed image. Therefore, no information at all is represented for the blank regions to the driver and therefore he also does not know whether or not objects are located in these regions of the environment. Observations have shown that the driver typically tends to manoeuvre his vehicle in such a manner that objects located in the environment move into the regions which cannot be acquired by the cameras. Such objects are overlaid by black fields in the displayed image and are therefore not represented. In certain circumstances, it can occur that the driver misjudges in the evaluation of the actual distance between the vehicle and the object. Therefore, the driver should avoid situations in which objects move into the non-imaged regions. Such collision situations—which are to be attributed to the behaviour of the driver—cannot be precluded, however. Therefore, a particular challenge is to allow collision-free manoeuvring of the vehicle.

It is the object of the invention to disclose a way in which, in a method of the species mentioned at the beginning, the risk of a collision during driving of the vehicle can be reduced to a minimum.

This object is achieved according to the invention by a method having the features of Patent Claim 1, and also by a driver assistance system having the features according to Patent Claim 9 and by a vehicle having the features of Patent Claim 10. Advantageous embodiments of the invention are the subject matter of the dependent patent claims and the description.

In a method according to the invention, an image is displayed on a display unit in a vehicle—in particular an automobile, preferably a passenger automobile. A vehicle image of at least one region of the vehicle is provided, and sensor data are acquired, which contain information about an environment of the vehicle. The displayed image is formed from the vehicle image and the sensor data, the image containing a blank region assigned to the environment, for which no sensor data are provided. In the displayed image, the vehicle image protrudes into the blank region.

The effect according to the invention is thus achieved in that in the image, the blank region of the environment is at least regionally overlaid by the vehicle image. In other words, the vehicle represented in the image at least regionally extends over the blank region, for which no sensor data are provided. In contrast to the prior art, the blank regions of the environment are therefore not represented as completely black, but rather the vehicle is represented in the image so that it at least regionally overlays the blank region. It is therefore pretended to the driver that the distance of objects located in the environment to the vehicle is less than the actual distance. The risk of a collision is thus reduced to a minimum. Specifically, the driver will drive his vehicle so that the objects represented in the image do not collide with the "falsely" represented vehicle and therefore always remain at a specific distance from the vehicle. A further advantage of the invention is that a visually appealing image is represented on the display unit, in which preferably no black fields or only significantly smaller fields are shown.

In the image, the vehicle image preferably protrudes completely into the blank region. This means that the blank region is completely overlaid by the vehicle image.

The vehicle image thus protrudes into the blank region in the represented image. This can be implemented in various ways: for example, the vehicle image can be shifted in the displayed image, so that it protrudes into the blank region. A further solution includes the vehicle being represented having an enlarged scale in relation to the environment in the displayed image, so that the blank region is at least regionally overlaid. A still further—additional or alternative—solution is that at least one region of the vehicle is represented as distorted in the vehicle image. Various embodiments are provided with respect to the vehicle image: the altered vehicle image can already have been stored previously in a storage unit. Alternatively, a realistic vehicle image can have been previously stored, and a computer unit can then process this vehicle image in such a way that the vehicle image overlays the blank region.

The vehicle image preferably shows the entire vehicle. The driver therefore has the entire vehicle displayed on the display unit and can inform himself about the environment around the vehicle.

As already mentioned, in the image, at least one region of the vehicle can be represented having an enlarged scale in relation to the environment. This enlarged region then at least regionally overlays the blank region. In this way, it is possible to cover the blank region of the environment with the vehicle image using the least data processing effort. Specifically, the vehicle image must accordingly merely be scaled larger in relation to the environment, so that an edge region of the vehicle moves into the blank region of the environment. This embodiment also has the advantage that the shape and the appearance of the vehicle in the image do not have to be impaired, i.e., the vehicle can be imaged realistically.

It has proven to be particularly advantageous if the entire vehicle is represented having the enlarged scale in the image. A plurality of blank regions around the vehicle can thus be at least regionally overlaid by the vehicle image, namely in particular both the blank regions located adjacent to the corner regions of the vehicle and optionally also a narrow region along the outer surface of the vehicle body. The data processing effort is also reduced to a minimum here; the vehicle image must merely be enlarged in scale, specifically in relation to the environment.

Additionally or alternatively, in the vehicle image, the shape—specifically, for example, a contour profile—of at least one region of the vehicle can be represented as distorted—i.e., falsified. The blank region is then at least regionally overlaid by this distorted region. This embodiment is particularly advantageous, for example, if individual smaller blank regions are to be overlaid by regions of the vehicle in the image. Specifically, for example, only the region of the vehicle which the blank region of the environment directly adjoins can be represented as distorted or falsified in relation to a realistic image. These are typically corner regions of the vehicle. If a blank region of the environment occurs adjacent to a corner region of the vehicle, the corner region can accordingly be represented as distorted. For example, it can appear that this corner region is stretched or enlarged, respectively, in the image, so that the blank region is overlaid by this region. This embodiment thus offers the possibility of overlaying individual blank regions of the environment adjacent to the vehicle by corresponding adjacent regions of the vehicle with a small technical effort. It can also be provided that in the image, the vehicle is initially represented with an enlarged scale in relation to the environment and then additionally at least one region of the vehicle is represented as distorted. Through such a combination, on the one hand, a narrower blank region located around the vehicle can be overlaid—namely through the enlarged scale of the vehicle; on the other hand, further blank regions located adjacent to the corner regions of the vehicle can thus be overlaid—namely through corresponding distortion of the corner regions in the image. In this way, it is possible in particular to completely overlay all blank regions by the vehicle image, so that only the vehicle and its environment can be represented in the displayed image.

The advantages of the invention come to bear completely in particular if the vehicle image represents a top view of the at least one region of the vehicle—in particular of the entire vehicle—and the sensor data are processed into image data, which represent a representation of a top view of the acquired environment. The top view of the at least one region of the vehicle and also of the environment is then represented in the image. Such a top view of the vehicle and the environment is particularly user-friendly: the driver can therefore particularly easily infer the distances between the vehicle and the objects located in the environment or recognize a critical situation, respectively. The driver can thus better judge the respective distances between the vehicle and any objects in the case of such a bird's eye perspective. However, the problem arises in particular in this case of the blank regions of the environment; specifically, for some regions of the environment which directly adjoin the vehicle, the sensor data are absent. The present invention remedies precisely these problems, in that the blank regions are at least regionally overlaid by the vehicle image in the displayed image.

In one embodiment, an extrapolation image is obtained for the blank region by an extrapolation of the sensor data, and the blank region is regionally overlaid by the extrapolation image in the displayed image. Therefore, additional data can also be obtained from the sensor data for the blank region, namely with the aid of an extrapolation. In this way, a region of the blank region can be regionally overlaid with "artificial" data—and not with black fields as in the prior art. This can appear, for example, so that a region of the blank region is overlaid with an extrapolation image, whose coloration corresponds to the coloration of the adjacent region of the acquired environment. A region of the blank region can thus be overlaid by the vehicle image, while a further region of the blank region is overlaid with the extrapolation image. The overlay of the blank region is preferably completed using the extrapolation image, i.e., the region of the blank region which is not overlaid by the vehicle image is overlaid with the extrapolation image. It is therefore possible to overlay the entire blank region with images, so that a visually appealing image can be represented as a whole on the display unit, specifically in particular without black regions and without the risk of a collision being increased.

The sensor data are preferably acquired with the aid of at least one camera, i.e., in particular with the aid of an optical acquisition unit, which can detect light in the spectral range visible by humans. For example, a total of at least four cameras can be provided, which are attached to the vehicle. For example, a first camera can be attached to a front bumper, a second camera to a rear bumper, a third camera to the left side flank or a left exterior mirror, and a fourth camera to the right side flank or a right exterior mirror. The cameras can have a relatively wide acquisition angle, namely in particular an acquisition angle greater than 170°, in particular greater than 180°. The entire environment of the vehicle can therefore be acquired, and an image can be generated which shows a top view of the environment of the vehicle.

A driver assistance system according to the invention for a vehicle is designed to display images. It comprises at least one sensor which is used to acquire sensor data, which contain information about an environment of the vehicle. The driver assistance system additionally comprises a computer unit, in which a vehicle image of at least one region of the vehicle is provided. The computer unit can generate an image from the vehicle image and the sensor data. This image contains a blank region assigned to the environment, for which no sensor data are provided. The driver assistance system additionally comprises a display unit, which is used to display the image. In the displayed image, the vehicle image protrudes into the blank region.

A vehicle according to the invention, in particular an automobile, comprises a driver assistance system according to the invention. The preferred embodiments presented with respect to the method according to the invention and the advantages thereof apply accordingly for the driver assistance system according to the invention, and also for the vehicle according to the invention.

Further features of the invention result from the claims, the figures, and the description of the figures. All features and combinations of features mentioned above in the description as well as the features and combinations of features mentioned in the description of the figures and/or shown alone in the figures are usable not only in the respective specified combination, but rather also in other combinations or also alone.

The invention will be explained in greater detail on the basis of individual preferred exemplary embodiments, and also with reference to the appended drawings.

In the figures:

FIG. 2 shows a schematic illustration of an image in which blank regions of an environment of the vehicle are shown;

FIG. 3 shows a schematic illustration of an image displayed by the driver assistance system, blank regions being overlaid by a vehicle image;

FIG. 4 shows a schematic illustration of an image in which corner regions of the vehicle are represented as distorted and blank regions overlay the environment; and FIG. 5 shows a schematic illustration of an image in which blank regions are overlaid by an extrapolation image.

Figure 1:
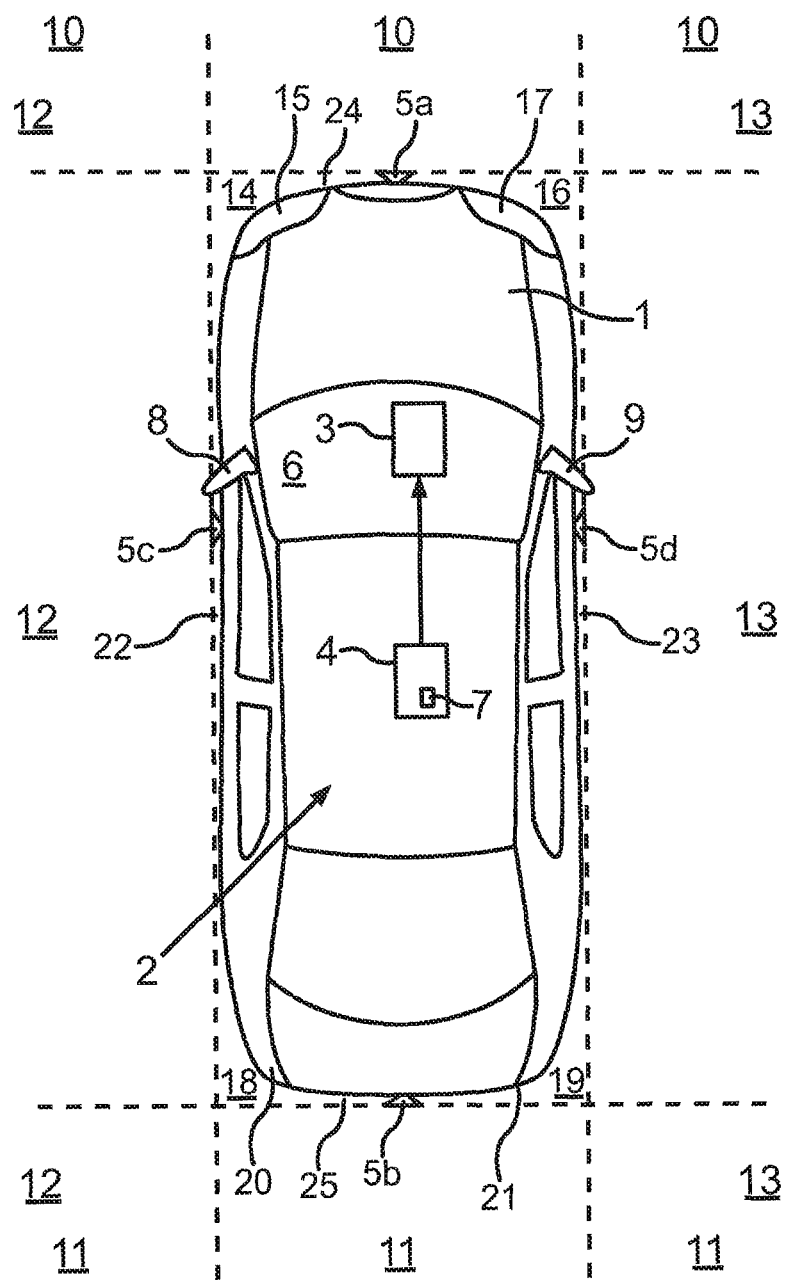
FIG. 1 shows a schematic illustration of a vehicle having a driver assistance system according to an embodiment of the invention.

A vehicle 1, as shown in FIG. 1, is a passenger automobile. The vehicle 1 comprises a driver assistance system 2, which contains the following components: a display unit 3, a computer unit 4, and also four cameras 5a to 5d. The computer unit 4 controls the display unit 3. The cameras 5a to 5d transmit acquired sensor data to the computer unit 4, specifically, for example, via an internal communication bus of the vehicle 1.

The display unit 3 can be an LCD display screen, for example. However, it can also be a projector, with the aid of which images can be projected on a windscreen 6 (a so-called heads-up display).

In addition, a vehicle image is stored in the computer unit 4—more precisely data which represent an image of the vehicle 1—specifically in a memory 7.

The cameras 5a to 5d are arranged on an outer surface of the vehicle 1. The number and the arrangement of the cameras 5a to 5d are solely shown as an example in FIG. 1; the number of the cameras 5a to 5d and their arrangement on the vehicle 1 can vary depending on the embodiment. In the exemplary embodiment, a first camera 5a is arranged on a front bumper of the vehicle 1, while a second camera 5b is arranged on a rear bumper. A third camera 5c is attached on the left side flank; it can also be integrated in a left exterior mirror 8. A fourth camera 5d is attached on the right side flank, namely in the region of a right exterior mirror 9. The fourth camera 5d can also be integrated in the exterior mirror 9.

The cameras 5a to 5d each have a broad acquisition angle and are therefore so-called fisheye cameras. For example, the respective acquisition angle can be in a value range from 170° to 190°. As shown in FIG. 1, the first camera 5a acquires a region 10 in front of the vehicle 1, while the second camera 5b acquires a region 11 behind the vehicle 1. Accordingly, the third camera 5c acquires a region 12 on the left adjacent to the vehicle 1; the fourth camera 5d acquires a region 13 on the right adjacent to the vehicle 1. The cameras 5a to 5d can thus acquire substantially the entire environment of the vehicle 1. However, regions exist in the environment of the vehicle 1 which cannot be acquired by the cameras 5a to 5d. Specifically, a first blank region 14 adjacent to a corner region 15 of the vehicle 1 cannot be acquired by the cameras 5a to 5d; in addition, a second blank region 16, which is located adjacent to a front right corner region 17 of the vehicle 1, cannot be acquired by the cameras 5a to 5d. In addition, blank regions 18, 19 exist adjacent to a rear left corner region 20 or a rear right corner region 21, respectively, of the vehicle 1. In addition, there are further blank regions of the environment: a blank region 22 directly adjoining the left side flank, a blank region 23 directly adjoining the right side flank, and also a blank region 24 directly adjoining the front bumper and a blank region 25 directly adjoining the rear bumper. The blank regions 22 to 25 are relatively flat and extend substantially vertically parallel to the outer surface of the vehicle 1. These blank regions 22 to 25 can optionally be eliminated by an appropriate arrangement of the cameras 5a to 5d and/or by appropriate selection of the acquisition angle.

The computer unit 4 can process the sensor data acquired by the cameras 5a to 5d. As already mentioned, the sensor data exist for the acquisition regions 10 to 13, while no sensor data are provided for the blank regions 14 to 25. The computer unit 4 can process the sensor data into image data, which represent a representation of a top view of the environment of the vehicle 1, specifically of the acquisition regions 10 to 13. The computer unit 4 can thus generate an environmental image from the sensor data, which shows a top view of the acquisition regions 10 to 13.

As already mentioned, a vehicle image of the vehicle 1 is stored in the memory 7. This vehicle image also shows the vehicle 1 from a bird's eye perspective; in other words, the vehicle image shows a top view of the vehicle 1. The computer unit 4 can generate an image from the environmental image and the vehicle image, so that in a single image both the environment of the vehicle 1 and also the vehicle 1 itself are shown from a bird's eye perspective. The computer unit 4 can display this image on the display unit 3. The image thus generated is continuously displayed on the display unit 3. This means that the image is continuously adapted to the environment of the vehicle 1. Specifically, the sensor data are continuously acquired by the cameras 5a to 5d.

A possible image 26 which can be generated by the computer unit 4 from the sensor data and the vehicle image is shown in FIG. 2. This image shows the vehicle image 1', and also the environment of the vehicle 1. As shown in FIG. 2, the image 26 contains blank regions 14', 16', 18', 19' assigned to the environment, and also blank regions 22' to 25'. No sensor data exist for these blank regions 14', 16', 18', 19', and 22' to 25'. In the prior art, these blank regions are represented as black, so that the image 26 shown in FIG. 2 is displayed to the driver. This can result in situations such that the driver manoeuvres the vehicle 1 in such a manner that objects initially imaged in the image 26 move into the blank regions 14', 16', 18', 19', and 22' to 25'. The driver can then no longer see these objects and should immediately brake the vehicle 1 in such a situation or not permit such a situation at all, respectively.

To preclude such situations, in the present exemplary embodiment, such an image is displayed on the display unit 3, in which the vehicle image 1' protrudes into the blank regions 14', 16', 18', 19', and 22' to 25'. An example of such an image 27 is shown in FIG. 3. In this image 27, the vehicle 1' is represented having an enlarged scale, specifically in relation to the environment. This can be performed, for example, in that an enlarged vehicle image 1' is already stored in the memory 7; alternatively, the computer unit 4 can enlarge the scale of the vehicle image 1' accordingly in quasi-real time by image processing. The vehicle image 1' in the image 27 thus shows the vehicle 1, whose dimensions are enlarged in relation to the environment. In the image 27, not only are the blank regions 22' to 25' therefore completely overlaid by the vehicle image 1', but rather partially also the blank regions 14', 16', 18', and 19'. An image 27 as is shown in FIG. 3 is therefore displayed to the driver. As shown in FIG. 3, all blank regions 14', 16', 18', 19', and 22' to 25' are almost completely overlaid in the image 27; only the blank regions 14', 16', 18', 19' are still partially visible. The image 27 has the advantage in relation to the image 26 that the driver overall perceives smaller distances between the vehicle 1' and objects in the environment than the actual distances. The possibility of permitting objects to move into the blank regions 14', 16', 18', 19' is restricted for the driver by the image 27, so that the risk of a collision is also reduced to a minimum.

A further step of image processing or an alternative embodiment can be that at least one region of the vehicle 1' is represented falsely or distorted, respectively, in the displayed image. FIG. 4 shows a detail of a further image 28, as is generated by the computer unit 4. The vehicle image 1' and also the environment from a bird's eye perspective are also represented in the image 28. As shown in FIG. 4, the blank regions 14' and 16' are completely overlaid by the vehicle image 1'. For this purpose, the corner regions 15', 17' of the vehicle 1' are shown distorted. Specifically, these corner regions 15', 17' are stretched and enlarged in comparison to the image 27 according to FIG. 3, so that they extend completely over the blank regions 14', 16'. In other words, the corner regions 15', 17' are less rounded and therefore more angled than the corner regions in the image 27 according to FIG. 3 or the actual corner regions 15, 17 of the vehicle 1, respectively. The rear corner regions of the vehicle image 1' can also be shown distorted accordingly, so that the blank regions 18', 19' are completely overlaid.

As already stated, the distortion of at least one region of the vehicle image 1' can be combined with the enlargement of the scale of the vehicle image 1'. However, the distortion can also be performed alternatively to the enlargement of the scaling.

Such a distorted image of the vehicle can either be obtained by the computer unit 4 through image processing of a vehicle image or it can already be stored beforehand in the memory 7.

FIG. 5 shows a further example of an image 29, in which the blank regions 14', 16', 18', and 19' are reduced in size in comparison to the image 26 according to FIG. 2. In this image 29, the vehicle image 1' is shown in the same scale as in the image 26 according to FIG. 2. This means that this scale corresponds to the scale of the environment. The vehicle image 1' can also be represented with an enlarged scale in the image 29 according to FIG. 5, however. In the image 29 according to FIG. 5, the blank regions 14', 16', 18', 19' are partially overlaid by interpolation images 30, 31, 32, 33. These interpolation images 30 to 33 are obtained by the computer unit 4 through extrapolation of the sensor data. In contrast to the prior art, the blank regions 14', 16', 18', 19' are therefore not overlaid by black fields, but rather by images which are obtained from the sensor data. This is particularly user-friendly; the driver is given the impression that the complete environment of the vehicle 1 is quasi-imaged.

The invention claimed is:

1. A method for displaying an image on a display unit in a vehicle, comprising:
   providing a vehicle image of at least one region of the vehicle;
   acquiring sensor data, which contain information about an environment of the vehicle; and
   displaying an image, which is formed from the vehicle image and the sensor data, the image containing a blank region assigned to the environment, for which no sensor data are provided,
   wherein, in the image, the vehicle image protrudes into the blank region.

2. The method according to claim 1, wherein the vehicle image shows the entire vehicle.

3. The method according to claim 1, wherein in the image, at least one region of the vehicle is represented having an enlarged scale in relation to the environment and wherein the enlarged region at least regionally overlays the blank region.

4. The method according to claim 3, wherein the entire vehicle is represented having the enlarged scale in the image.

5. The method according to claim 1, wherein in the vehicle image, a shape of at least one region of the vehicle is represented as distorted, and the blank region is at least regionally overlaid by this distorted region.

6. The method according to claim 1, wherein the vehicle image represents a top view of the at least one region of the vehicle and the sensor data are processed into image data, which represent a representation of a top view of the acquired environment, the top view of the at least one region of the vehicle and of the environment being represented in the image.

7. The method according to claim 1, wherein an extrapolation image is obtained for the blank region by an extrapolation of the sensor data and the blank region is regionally overlaid by the extrapolation image in the displayed image.

8. The method according to claim 1, wherein the sensor data are acquired by a camera.

9. A driver assistance system for displaying images for a vehicle, comprising:
   at least one sensor for acquiring sensor data, which contain information about an environment of the vehicle;
   a computer unit, in which a vehicle image of at least one region of the vehicle is provided, wherein the computer unit is for generating an image from the vehicle image and the sensor data, the image comprising a blank region assigned to the environment, for which no sensor data are provided; and
   a display unit for displaying the image,
   wherein, in the image, the vehicle image protrudes into the blank region.

10. An automobile vehicle having a driver assistance system according to claim 9.

* * * * *